(12) United States Patent
Lee et al.

(10) Patent No.: US 8,908,897 B2
(45) Date of Patent: Dec. 9, 2014

(54) DUAL ACOUSTIC WAVEGUIDE

(75) Inventors: Barry J Lee, Santa Cruz, CA (US); James F Bobisuthi, Boulder Creek, CA (US); Bradley Yearous, Aptos, CA (US)

(73) Assignee: Plantronics, Inc., Santa Cruz, CA (US)

( * ) Notice: Subject to any disclaimer, the term of this patent is extended or adjusted under 35 U.S.C. 154(b) by 256 days.

(21) Appl. No.: 13/193,465

(22) Filed: Jul. 28, 2011

(65) Prior Publication Data
US 2013/0028460 A1    Jan. 31, 2013

(51) Int. Cl.
| | |
|---|---|
| H04R 25/00 | (2006.01) |
| B29C 65/00 | (2006.01) |
| B29C 45/00 | (2006.01) |
| B29C 65/16 | (2006.01) |
| B29C 65/78 | (2006.01) |
| B29L 31/34 | (2006.01) |
| B29C 65/50 | (2006.01) |
| H04R 1/34 | (2006.01) |

(52) U.S. Cl.
CPC ......... B29C 65/1654 (2013.01); B29C 65/7814 (2013.01); B29C 66/1122 (2013.01); B29C 66/1142 (2013.01); B29C 66/54 (2013.01); B29C 66/836 (2013.01); B29C 66/5346 (2013.01); *B29L 2031/34* (2013.01); *B29C 65/1667* (2013.01); *B29C 65/5057* (2013.01); *B29C 66/712* (2013.01); *H04R 1/342* (2013.01)

USPC ............ 381/370; 156/245; 381/385; 381/375

(58) Field of Classification Search
USPC .......................................... 381/375, 370, 385
See application file for complete search history.

(56) References Cited

U.S. PATENT DOCUMENTS

| | | | | |
|---|---|---|---|---|
| 6,434,251 | B1 * | 8/2002 | Jensen et al. ................... | 381/385 |
| 6,766,032 | B1 * | 7/2004 | Lee et al. ....................... | 381/375 |
| 2003/0173145 | A1 * | 9/2003 | Groth et al. .................... | 181/153 |
| 2007/0184881 | A1 * | 8/2007 | Wahl et al. ................. | 455/575.2 |

* cited by examiner

*Primary Examiner* — Duc Nguyen
*Assistant Examiner* — Phan Le
(74) *Attorney, Agent, or Firm* — Chuang Intellectual Property Law

(57) ABSTRACT

Methods and apparatuses for acoustic waveguides are disclosed. In one example, a method for constructing an acoustic waveguide includes forming a first acoustic waveguide component having a first outer surface and a first inner surface, where the first inner surface includes a first groove and a second groove. The method includes forming a second acoustic waveguide component having a second outer surface and a second inner surface, where the second inner surface includes a third groove and a fourth groove. The first acoustic waveguide component and the second acoustic waveguide component are bonded together so that the first groove and the third groove are arranged to form a first acoustic channel and the second groove and the fourth groove are arranged to form a second acoustic channel.

19 Claims, 9 Drawing Sheets

DUAL ACOUSTIC WAVEGUIDE

BACKGROUND OF THE INVENTION

Traditional headsets have employed a design in which a microphone is extended from a boom and positioned close to a sound source, such as a user's mouth, in an attempt to achieve sound reception clarity. Increasing proximity of the microphone to the sound source, however, has required increasing the size of the boom in order to accommodate the microphone at the distal end of the boom near the user's mouth. In addition, placing the microphone at the distal end of the boom may increase the overall weight of the boom. This added weight can be undesirable from a user comfort perspective. From an aesthetic perspective, the increased thickness of the boom required to house a microphone may be undesirable.

Furthermore, manufacturing costs for a boom increase with greater complexity of the boom. Placing the microphone near the distal end of the boom complicates the manufacturing process as more steps are required to properly house the microphone.

Thus, devices for transmitting acoustic signals having improved acoustic, weight, manufacturing cost and/or aesthetic properties are needed.

BRIEF DESCRIPTION OF THE DRAWINGS

The present invention will be readily understood by the following detailed description in conjunction with the accompanying drawings, wherein like reference numerals designate like structural elements.

DESCRIPTION OF SPECIFIC EMBODIMENTS

Figure 1:
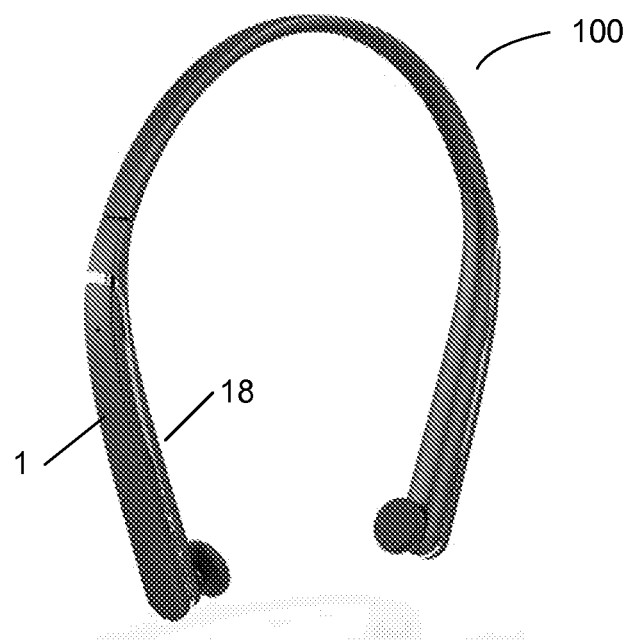
FIG. 1 illustrates a perspective view of a headset with boom a in stored position.

Methods and apparatuses for acoustic waveguides are disclosed. The following description is presented to enable any person skilled in the art to make and use the invention. Descriptions of specific embodiments and applications are provided only as examples and various modifications will be readily apparent to those skilled in the art. The general principles defined herein may be applied to other embodiments and applications without departing from the spirit and scope of the invention. Thus, the present invention is to be accorded the widest scope encompassing numerous alternatives, modifications and equivalents consistent with the principles and features disclosed herein. For purpose of clarity, details relating to technical material that is known in the technical fields related to the invention have not been described in detail so as not to unnecessarily obscure the present invention.

This invention relates to acoustic waveguide solutions, such as those used in head worn devices utilizing booms. In one example, the present invention provides a reliable means of providing a headset with directional microphone performance of minimum size and weight but with consistent acoustic performance and high manufacturing yields.

Communications headsets can be used in a diversity of applications, and are particularly effective for use with mobile communications devices such as cellular telephones. Some headsets have long booms which place the acoustic sensing point near the user's mouth, while other headsets have short booms or no booms at all. The term "acoustic sensing point" is used herein to refer to the point (or more generally, location) in space where a headset collects sound waves. In some telephone headsets, the microphone is located directly at the acoustic sensing point at the distal end of a boom. In others, the boom is a hollow tube operating as an acoustic waveguide, and the acoustic sound travels from the sound sensing point at the distal end of the boom to the microphone located near the proximal end of the boom.

When a short boom or boomless headset is used, there is a large distance between the user's mouth and the acoustic sensing point of the headset. When such headsets are used in noisy environments, this typically leads to a lower than desirable signal-to-noise ratio in the transmit signals (i.e. ratio between the amount of signals associated with the desired acoustic source such as the user's mouth and those from background noise). However, because of the unobtrusive and stylish appearance and easy stowability of compact short boom or boomless headsets, users continue to prefer these types of headsets in many applications.

As a compromise between the needs for compactness and style and for satisfactory transmit signal quality, communications headsets with foldable booms are available. Some of these headsets have a non-operational compact mode, with the boom folded on top of the body, that allows for stowability, and also an extended-boom mode in which the headset can operate with improved transmit signal quality. Hence, a user can stow a foldable communications headset in the compact mode, and in the extended-boom mode the headset can be used for communication. It is desirable that the boom be as thin as possible so that when folded on top of the headset body, the headset maintains a slim and aesthetically appealing (e.g., flush and sleek) form factor.

The use of an acoustic waveguide (e.g., a voice-tube) to convey sound from the desired position near the user's mouth allows the microphone to be placed in a more convenient location from a design perspective. Since directional microphones necessarily sample the sound-field at two or more locations, a minimum of two acoustic waveguides are required to relocate a directional microphone from the boom tip while maintaining the port locations desired from a performance standpoint. These waveguides must have carefully controlled relative lengths and cross-sections in order to maintain the desired directional pattern.

In the case of a foldable boom, one solution is to move the microphone close to the pivot but keep it rigidly connected to the waveguides in such a way as the microphone and waveguides move together, eliminating the need to convey the sound through a moving joint. Moving the microphone from the tip to the area of the pivot proved to have similar impacts on size, partly due to the size of the microphone and the associated boots but also the additional volume required by additional wall thicknesses of the acoustic waveguides and the boot/waveguide interface. To resolve this issue, one example of the present invention describes a construction method by which the thickness of the boom can be minimized, the acoustic waveguides optimized and the sound conveyed through the pivot in such a way as to allow the microphone (or microphones) to be located in the portion of the headset on the stationary side of the pivot.

The inventors have recognized several problems with prior art methods for forming dual acoustic waveguides, both in fixed boom and movable boom configurations. In one prior art device incorporating dual waveguides in a fixed-boom configuration, the physical structure used tubing to connect a rubber microphone boot to the port location in the boom housing. This construction is difficult to produce with tight tolerances since minor changes in the assembly of the tubes to the other portions of the structure (boot and housing) result in effective length differences for the waveguide and changes in the relative phase of the acoustic signals presented to the microphones. This in turn causes problems in the directivity and noise reduction algorithms.

In one prior art device incorporating dual acoustic waveguides that operate through a pivot, concentric waveguides consisting of extruded tubing are used. Unfortunately, these are very difficult to produce with identical acoustic properties since the shapes of the waveguides are necessarily different. The central waveguide is circular (at least through the pivot) while the outer waveguide is a cylindrical slit. In addition, the transitions to the microphone(s) are geometrically different and maintaining symmetrical acoustic performance is very difficult both in theory and practice.

In one example of the present invention, a method for constructing an acoustic waveguide includes forming a first acoustic waveguide component having a first outer surface and a first inner surface, where the first inner surface includes a first groove (also referred to as a "channel" or a "trace") and a second groove. The method includes forming a second acoustic waveguide component having a second outer surface and a second inner surface, where the second inner surface includes a third groove and a fourth groove. The first acoustic waveguide component and the second acoustic waveguide component are bonded together so that the first groove and the third groove are arranged to form a first acoustic channel and the second groove and the fourth groove are arranged to form a second acoustic channel. In one example, the first acoustic waveguide component is a first headset boom component and the second acoustic waveguide component is a second headset boom component. Bonding the first acoustic waveguide component and the second acoustic waveguide component together forms a headset boom configured to be coupled to a headset body.

In one example, an acoustic waveguide includes a first component having a first outer surface and a first inner surface, where the first inner surface has a first groove including a first meander and a second groove. The acoustic waveguide includes a second component having an outer surface and an inner surface, where the inner surface has a third groove including a second meander and a fourth groove, where the first component is joined to the second component so that the first groove and the third groove form a first acoustic channel including a meander and the second groove and the fourth groove form a second acoustic channel. For example, the acoustic waveguide may be a headset boom.

In one example, a headset boom includes a first boom component having a first outer surface and a first inner surface, where the first inner surface has a first groove including a first meander and a second groove. The headset boom includes a second boom component having an outer surface and an inner surface, where the inner surface has a third groove including a second meander and a fourth groove, where the first boom component is joined to the second boom component so that the first groove and the third groove form a first acoustic channel including a meander and the second groove and the fourth groove form a second acoustic channel.

In one example, a method for constructing an acoustic waveguide includes providing a first housing having a first outer surface and a first inner surface, where the first inner surface includes a first groove and a second groove. A second housing is provided having a second outer surface and a second inner surface. The method includes bonding the first housing and the second housing together so that the first groove is sealed to form a first acoustic channel and the second groove is sealed to form a second acoustic channel. For example, the first housing may be a first headset boom component and the second housing may be a second headset boom component.

In one example, a headset boom includes a first boom component having a first outer surface and a first inner surface, where the first inner surface includes a first groove having a first meander and a second groove. The headset boom further includes a second boom component having a second outer surface and a second inner surface, where the first boom component is joined to the second boom component so that the first groove forms a first acoustic channel and the second groove forms a second acoustic channel.

In one example, an acoustic waveguide is created out of two grooves or half-pipes (i.e., tubes split longitudinally) such as when two component parts are assembled the halves combine to form a fully-enclosed tube. Advantageously, this allows the parts to be easily molded without the long, thin cores that would be required to mold the part as a single piece. The cross-sectional area of the waveguide can be distributed between the assembly "halves" in any way as long as the finished assembly creates a fully enclosed waveguide. Thus one could also produce a waveguide with groove in only one side that was simply covered with a flat plate on the other side to enclose the groove.

A further advantage is that this construction minimizes the thickness of the resulting assembly. Since the waveguide is formed by the interior surface of the same parts which can also form the exterior of the assembly, no additional material is required for the waveguide. Using a separately formed waveguide would require that the waveguide, including its walls, may be encased in an additional thickness of material for the boom external surface. When the overall thickness of the boom is in the vicinity of 3 mm. two additional plastic layers (approx. 0.8 mm minimum each) would increase the overall thickness by an additional 50% which is undesirable from an industrial design perspective.

In one embodiment of the present invention, a portion of each acoustic waveguide is molded into each boom half and the two halves of the boom are bonded together to form the complete acoustic waveguide as part of the structure of the boom. This allows the acoustic waveguides to be matched for length and cross-section over their entire length and hence acoustic performance is matched. The path length of each acoustic waveguide is known and can be controlled, for example, the offset between the ports would shorten the length of the $2^{nd}$ acoustic waveguide considerably. This reduction in length is accounted for by meandering the path of $2^{nd}$ acoustic waveguide thus increasing the length to match that of the $1^{st}$ acoustic waveguide.

In one example, laser welding is utilized to join the boom halves. The use of laser welding, by either curtain or path trace welding, advantageously allows each acoustic waveguide to be sealed from the other with the minimum of 'land' around each acoustic waveguide. In further examples, other methods for bonding the two boom halves include utilizing double sided adhesive tape cut to dimension and ultrasonic welding.

Figure 2:
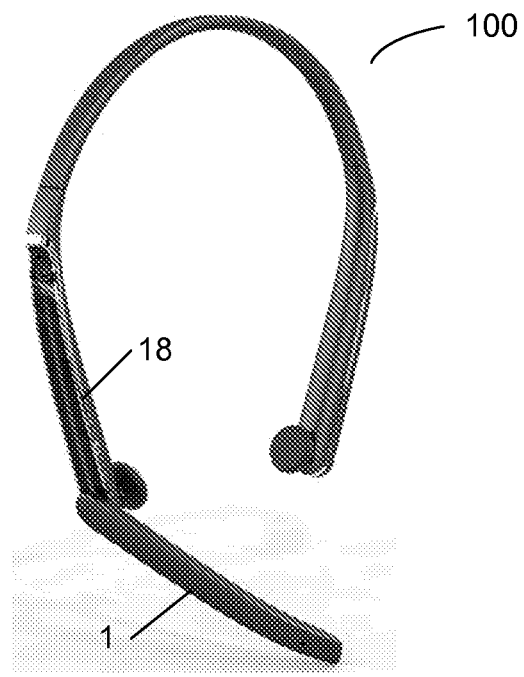
FIG. 2 illustrates a perspective view of a headset with boom in an in-use position.

FIG. 1 illustrates a perspective view of a headset 100 with a headset boom 1 in a stored position. FIG. 2 illustrates a perspective view of the headset 100 with boom 1 in an in-use position. As shown in FIG. 1 and FIG. 2, headset boom 1 is coupled to a headset body 18 at a pivot point so that it is adapted to be moved between the stored and in-use position as desired by a headset wearer.

Figure 3A:
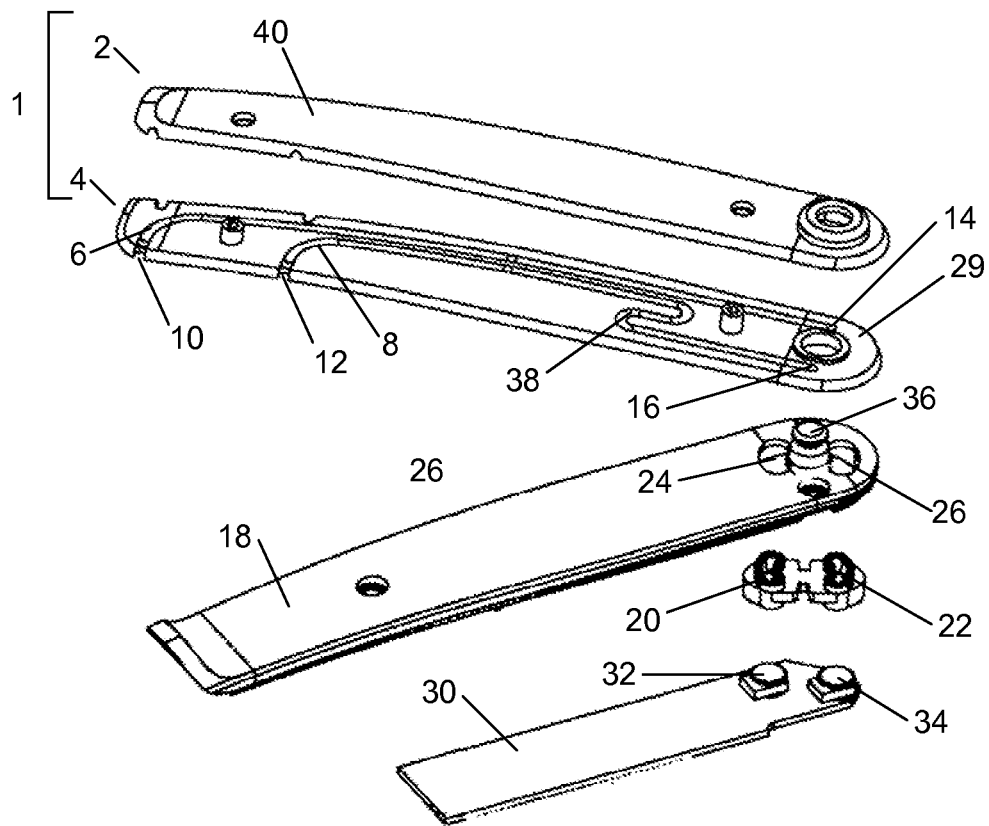
FIG. 3A illustrates a top perspective view of a disassembled headset in one example.
Figure 3B:
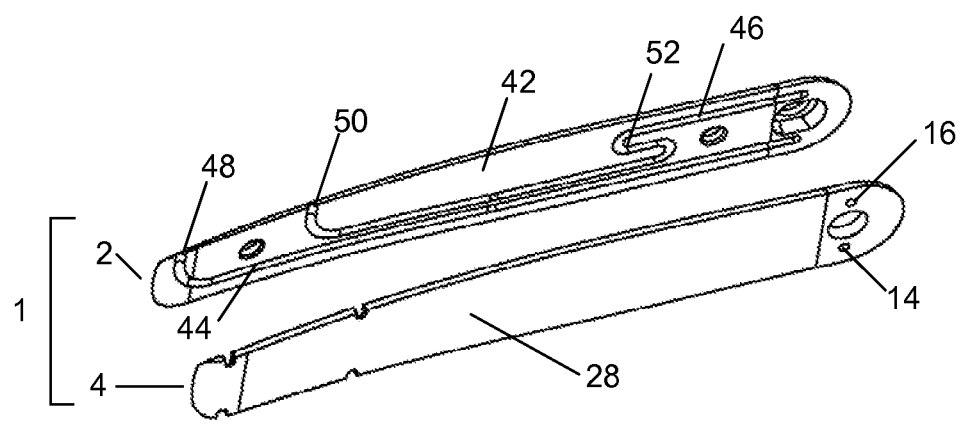
FIG. 3B illustrates a bottom perspective view of the disassembled headset boom shown in FIG. 3A.

FIG. 3A illustrates a top perspective view of a disassembled headset 100 in an example where the boom 1 rotates in a 2-dimensional plane to shift between the stored position and the in-use position. FIG. 3B illustrates a bottom perspective view of the disassembled headset boom 1 shown in FIG. 3A.

Referring to FIG. 3A and FIG. 3B, headset 100 includes a boom 1 and headset body 18. Headset boom 1 is composed of a boom half 2 and a boom half 4. In one example, the boom half 2 and the boom half 4 are formed utilizing an injection molding process.

Boom half 4 includes an outer surface 28 and an inner surface 29. Inner surface 29 of boom half 4 includes a groove 6 and groove 8. In one example, groove 8 includes a meander 38. Boom half 2 includes an outer surface 40 and an inner surface 42. Inner surface 42 of boom half 2 includes a groove 44 and groove 46 as shown in FIG. 3B. In one example, groove 46 includes a meander 52. As shown in FIG. 3B, in one example the groove 44 and the groove 46 have a same path length and a different path layout on the boom half 2 inner surface 42.

In one example, the groove 8 and groove 6 are symmetrical in cross-sectional size and shape and the groove 46 and groove 44 are symmetrical in cross-sectional size and shape. For example, the groove 8 and the groove 6 are substantially semi-circular. Groove 6 includes a first end terminating in a port 10 and a second end terminating in an aperture 14. Aperture 14 extends from inner surface 29 through outer surface 28. Groove 8 includes a first end terminating in a port 12 and a second end terminating in an aperture 16. Aperture 16 extends from inner surface 29 through outer surface 28. Groove 44 on inner surface 42 of boom half 2 includes a first end terminating in a port 48. Groove 46 on inner surface 42 includes a first end terminating in a port 50.

Figure 5:
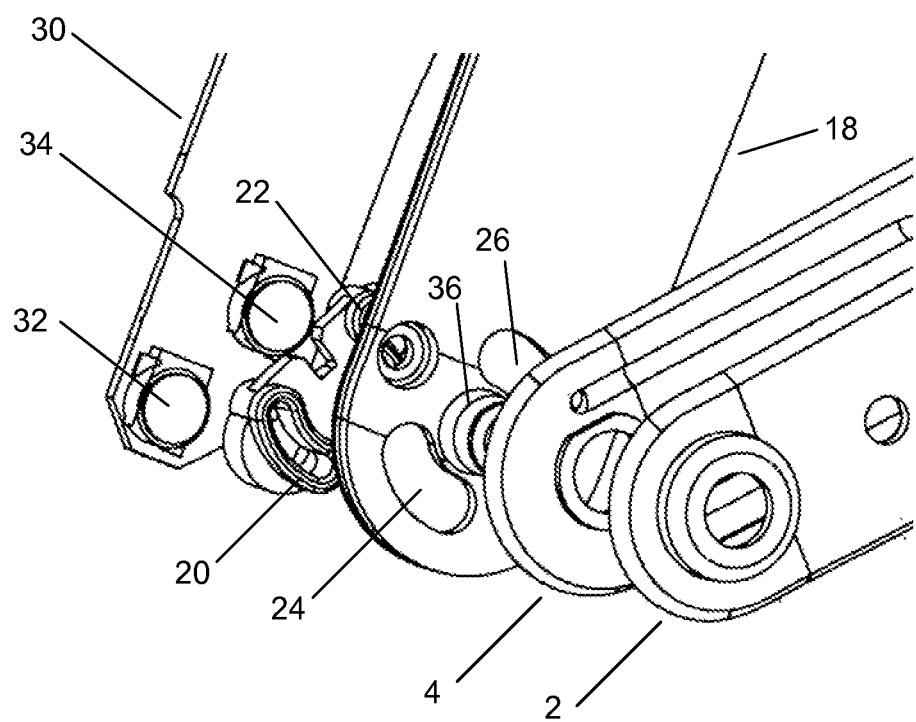
FIG. 5 illustrates an alternative top perspective view of a disassembled headset.

The headset 100 also includes a headset body 18, microphone boot 20, microphone boot 22, microphone 32, microphone 34, and PCB 30. Headset body 18 includes a pivot 36 on which headset boom 1 is rotatably attached. In one example, headset body 18 includes aperture 24 and aperture 26 through which a portion of boot 20 and boot 22 are inserted, respectively. Aperture 24 and aperture 26 are aligned with apertures 14 and 16 when the boom 1 is in an in-use position. Boot 20 and boot 22 operate to form a seal against outer surface 28 of boom half 4, thereby providing an acoustic channel to microphone 32 and microphone 34. FIG. 5 illustrates an alternative top perspective view of the disassembled headset 100. In the example shown in FIG. 5, microphone boot 20 and microphone boot 22 are integrated into a single piece.

Figure 6:
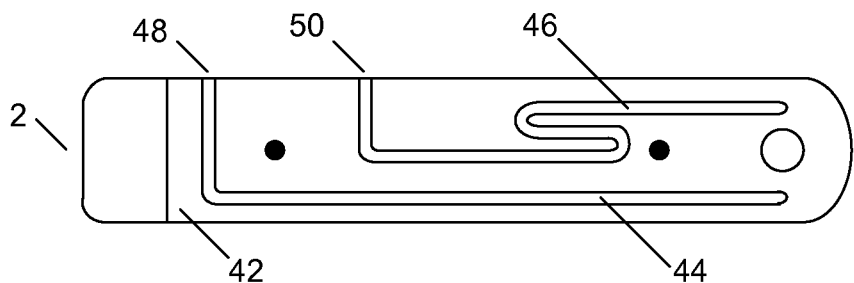
FIG. 6 illustrates a top view of the first headset boom component shown in FIG. 3B.
Figure 7:
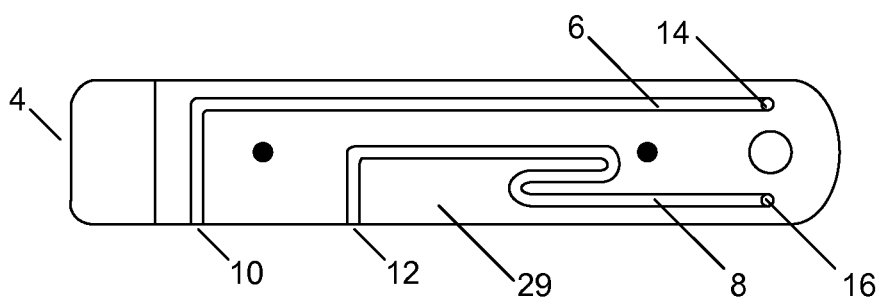
FIG. 7 illustrates a top view of a second headset boom component shown in FIG. 3A.
Figure 10:
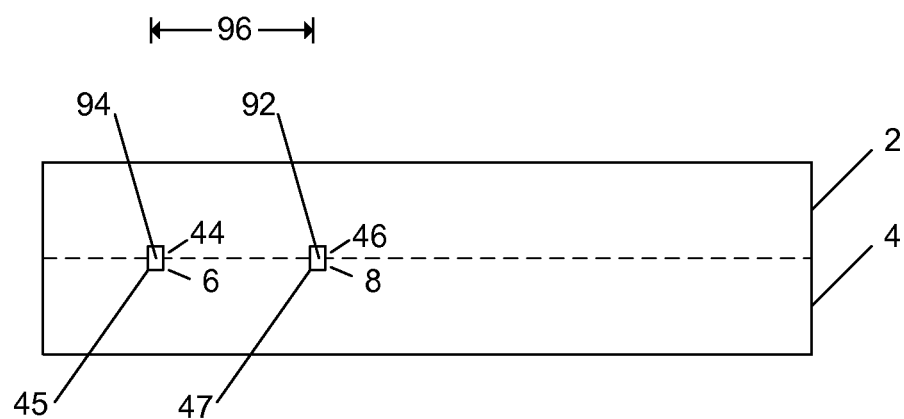
FIG. 10 illustrates a side view of the first headset boom component shown in FIG. 8 and the second headset boom component shown in FIG. 9 joined together to form a headset boom.

FIG. 6 illustrates a top view of a boom half 2. Boom half 2 is formed having an inner surface 42 having groove 44 and groove 46. FIG. 7 illustrates a top view of a boom half 4. Boom half 4 is formed having an inner surface 29 having a groove 6 and groove 8. In one example, boom half 2 and 4 are formed utilizing an injection molding process. FIG. 10 illustrates a side view of a boom half 2 and a boom half 4 joined together.

Referring to FIGS. 6-7 and FIG. 10, in assembling the headset boom 1, the boom half 2 is joined to the boom half 4 so that the groove 46 and the groove 8 form an acoustic channel 47 including a meander and the groove 44 and the groove 6 form a acoustic channel 45. In one example, the boom half 2 and the boom half 4 are joined by bonding the boom half 2 and the boom half 4 together using a laser welding process. In one example, the acoustic channel 47 and the acoustic channel 45 have a same path length and same cross sectional area.

In one example, the acoustic channel 47 includes a first end terminating in a port 92 configured to receive acoustic waves associated with user speech and a second end configured to transmit acoustic waves to a first microphone port. In one example, the acoustic channel 47 second end terminates in aperture 16. The acoustic channel 45 includes a third end terminating in a port 94 configured to receive acoustic waves associated with user speech and a fourth end configured to transmit acoustic waves to a second microphone port. In one example, the acoustic channel 45 fourth end terminates in aperture 14.

Port 92 and the port 94 are separated by an offset distance 96 and the acoustic channel 47 and the acoustic channel 45 have a same path length. In one example, the acoustic channel 47 includes a meander configured so that the acoustic channel 47 and the acoustic channel 45 have a same path length. In one example, the port 92 and the port 94 are disposed on a boom side surface as shown in FIG. 10.

In one example, microphone 32 and 34 are a pair of omnidirectional microphones which are combined electronically to provide the equivalent of a directional microphone. In one example, ports 10 and 12 are disposed so that the line intersecting the center of the port apertures be parallel to the boom axis in order to ensure that the axis of the directional pattern of the composite microphone is directed toward the user's mouth when the boom is in its in-use position. At the pivot end of the boom 1, the waveguides are conveyed through holes on the inner surface 29 of the boom assembly to engage the semi-circular front-cavities in the microphone boots 20, 22 when the boom is rotated to the in-use position. The boots 20, 22 seal to the inner surface 29 and convey the acoustic signals to the microphones 32, 34 with a minimum of stray volume. Since it is necessary to match the tube lengths and the boom-end ports are at 90 degrees to the microphone ports, it is necessary to create the meander seen in the second tube which would otherwise be significantly shorter. This is easy to produce with this construction but would otherwise be impossible in extruded construction or using an injection-mold using a typical tool geometry. In typical injection molding, holes are created by producing a pin in the mold which leaves a void in the plastic when it is removed by pulling it longitudinally out of the hole it forms. A pin to provide these long, small diameter holes would be impractically long and thin if an attempt was made to create the waveguides in this manner as the tool would break easily. In addition, if an attempt was made to create a meander in this alternate tool configuration, the pin would need to be bent into the meander shape and once the plastic cooled it would be locked in place making it impossible to remove the part.

Note that this method of creating the acoustic waveguides is desirable for control of the waveguide properties even if the headset design does not require a pivoting boom. In one example, a boom cover may be utilized to cover the pivot end and provide a cosmetic surface.

The acoustic waveguides (i.e., grooves 6, 8, 44, 46) are molded into the boom halves plastics and the two halves of the boom (boom half 2 and boom half 4) are bonded together to form the acoustic waveguides as part of the structure of the boom 1. This allows the acoustic waveguides to be matched for length and cross-section over their entire length and hence acoustic performance. The path length of each acoustic waveguide is known and can be controlled. For example, the offset between the ports shortens the length of the $2^{nd}$ acoustic waveguide considerably. This reduction in length can be accounted for by meandering the path of $2^{nd}$ acoustic waveguide, thus increasing the length to match that of the $1^{st}$ acoustic waveguide.

In this example, the boom 1 pivots in a flat plane around a single axis, which allows the acoustic waveguides to interface directly to the microphone boots 20, 22 via a sliding seal, thus minimizing and differences in tube dimensions resulting in a very stable, controlled design for acoustics and digital signal processing to work with. This interface also permits a range of angular adjustment which allows the boom 1 to be adjusted to suit the user. Although two microphones and boots are shown, in an alternative example, a single noise cancelling microphone in a single boot with similar ports and port placements to those shown may be used.

The boom 1 acoustic waveguide structure is substantially thin, the dimensions only limited by the cross-sectional area of the acoustic waveguides, the land need to join the two boom halves, and the material required to form the acoustic waveguides. This attribute can give design flexibility by providing the opportunity for a decorative outer cover.

The use of laser welding, by either curtain or path trace welding, allows each acoustic waveguide to be sealed from the other with the minimum of 'land' around each acoustic waveguide. Other methods for bonding the two halves are available, including double sided adhesive tape cut to dimension and ultrasonic welding. The use of laser welding, versus other methods of joining two plastic materials, is beneficial in many ways. It allows two individual parts, either of the same or dissimilar materials, to become one homogenous unit with minimal flash at the joint boundaries. With respect to the dual acoustic waveguides, minimal flash in the acoustic waveguides, maintaining the 'as designed' tube dimensions. Laser welding using a curtain beam generates a melt pool of the two materials, across the entire width of the part which when solidified creates a complete bond across the entire surface of the joint. One solid piece of material is produced, with the acoustic waveguide(s) through it. Because the two parts become one contiguous unit, they flex as one. The two parts will not separate when subjected to environmental testing, be it chemical, extensive hot or cold cycling, or physical cycling. The parts have to be destroyed to be separated. The use of laser welding provides for good for acoustics, enabling control of the shape of the acoustic waveguide(s) such that the acoustic waveguide(s) have a complete acoustic and environmental seal.

Figure 11:
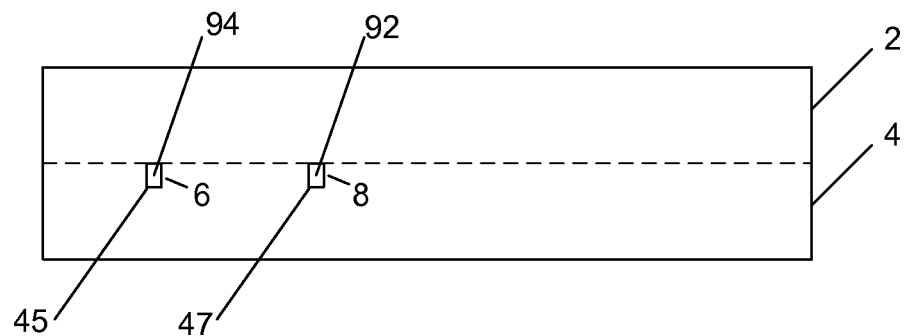
FIG. 11 illustrates a side view of a first headset boom component and a second headset boom component joined together in a further example.

In a further example, boom half 2 is modified so that the boom half inner surface 42 does not include groove 44 and groove 46. Boom half 4 remains as described above in reference to FIGS. 3A-3B and FIG. 7. Boom half 2 and boom half 4 are joined together to form a headset boom so that the groove 6 is sealed to form a first acoustic channel and the groove 8 is sealed to form a second acoustic channel. A laser welding process may be utilized as described previously. In this example, groove 6 of boom half 4 in itself forms the entirety of the first acoustic channel and groove 8 in itself forms the entirety of the second acoustic channel, as shown in FIG. 11. The first acoustic channel and the second acoustic channel otherwise are configured and operable as described above. Referring to FIG. 11, groove 6 forms an acoustic channel 45 and groove 8 forms an acoustic channel 47. The acoustic channel 47 includes an end terminating in a port 92 configured to receive acoustic waves associated with user speech and a second end configured to transmit acoustic waves to a first microphone port. The acoustic channel 45 includes an end terminating in a port 94 configured to receive acoustic waves associated with user speech and a fourth end configured to transmit acoustic waves to a second microphone port. In one example, the port 92 and the port 94 are disposed on a boom side surface as shown in FIG. 11.

Figure 4A:
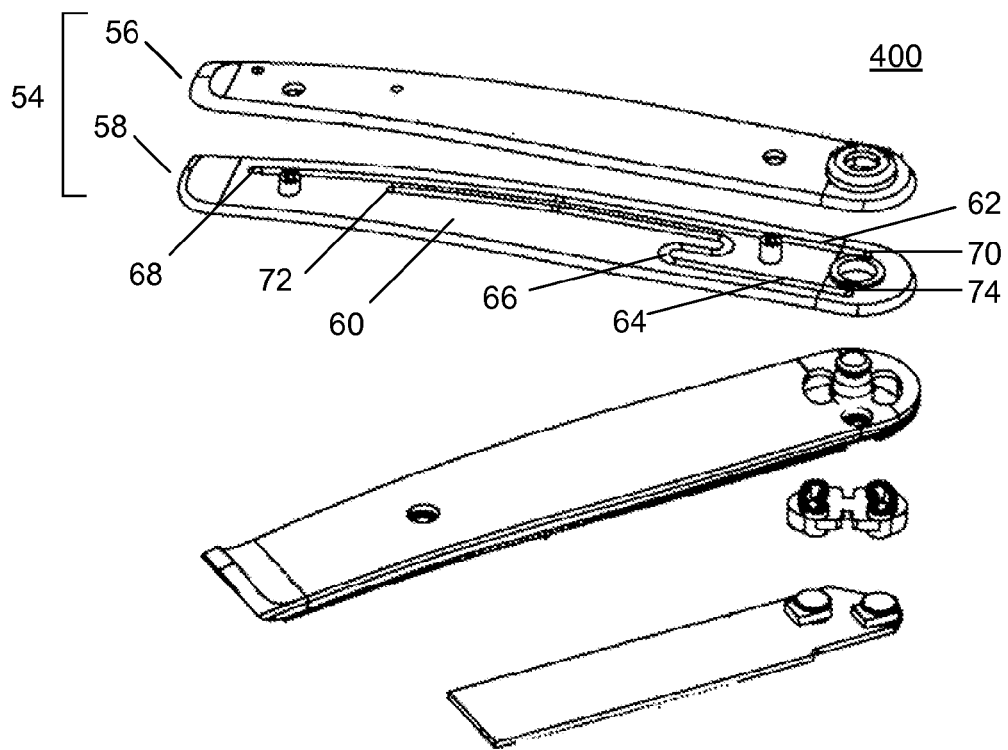
FIG. 4A illustrates a top perspective view of a disassembled headset in a further example.
Figure 4B:
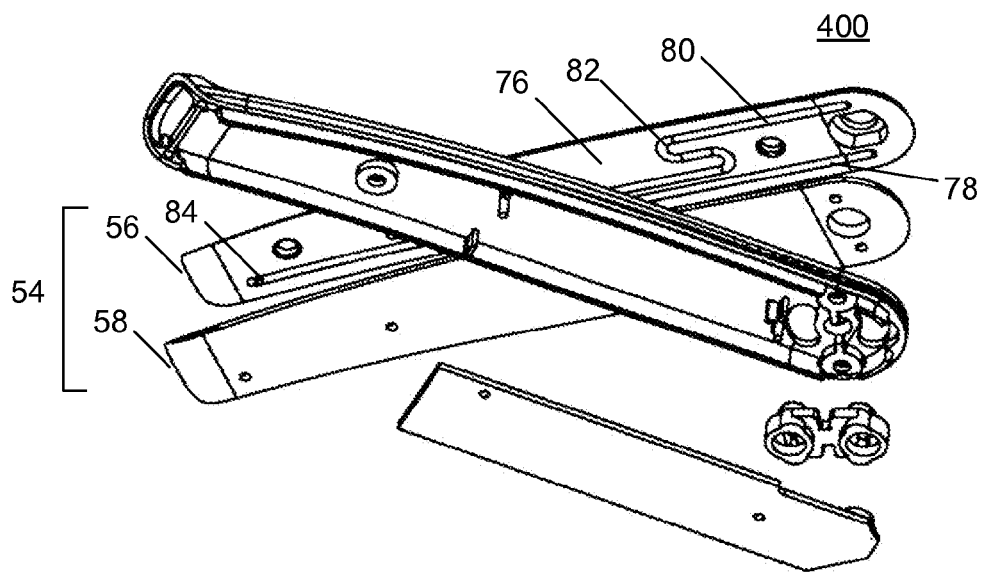
FIG. 4B illustrates a bottom perspective view of a disassembled headset in a further example.

FIG. 4A illustrates a top perspective view of a disassembled headset 400 in a further example. FIG. 4B illustrates a bottom perspective view of the disassembled headset 400 shown in FIG. 4A. Headset 400 is substantially similar to headset 100 described above in reference to FIGS. 3A and 3B except that boom 1 has been replaced with a boom 54. Referring to FIG. 3A and FIG. 3B, headset 100 includes a boom 54. Headset boom 54 is composed of a boom half 56 and a boom half 58. In one example, the boom half 56 and the boom half 58 are formed utilizing an injection molding process.

Boom half 58 includes an inner surface 60. Inner surface 60 of boom half 58 includes a groove 62 and groove 64. In one example, groove 64 includes a meander 66. Boom half 56 includes an inner surface 76. Inner surface 76 of boom half 56 includes a groove 78 and groove 80 as shown in FIG. 4B. In one example, groove 80 includes a meander 82. As shown in FIG. 4B, in one example the groove 78 and the groove 80 have a same path length and a different path layout on the boom half 56 inner surface 76.

In one example, the groove 64 and groove 62 are symmetrical in cross-sectional size and shape and the groove 80 and groove 78 are symmetrical in cross-sectional size and shape. For example, the groove 64 and the groove 62 are substantially semi-circular. Groove 62 includes a first end terminating in an aperture 68 and a second end terminating in an aperture 70. Apertures 68 and 70 operate as ports for sound waves and extend through the thickness of boom half 58. Groove 64 includes a first end terminating in an aperture 72 and a second end terminating in an aperture 74. Apertures 72 and 74 operate as ports for sound waves and extend through the thickness of boom half 58. Apertures 70 and 74 are operable to communicate sound waves to the microphones via the microphone boots as described above.

Groove 78 on inner surface 76 of boom half 56 includes a first end terminating in an aperture 84 for receiving sound waves corresponding to a user voice. Groove 80 on inner surface 76 includes a first end terminating in an aperture 88 for receiving sound waves corresponding to a user voice.

Figure 8:
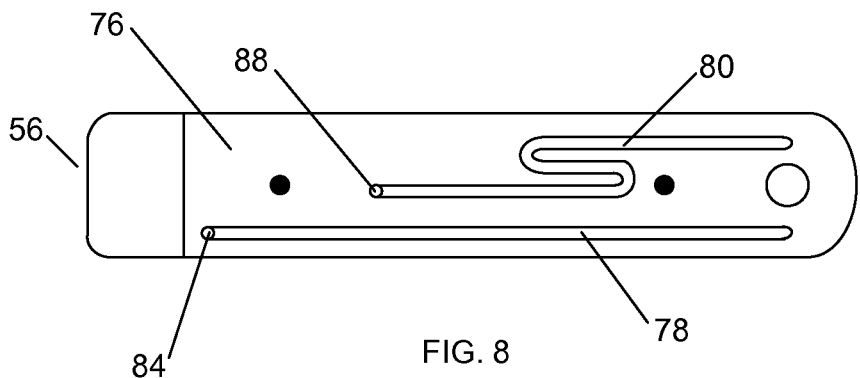
FIG. 8 illustrates a top view of the first headset boom component shown in FIG. 4A.
Figure 9:
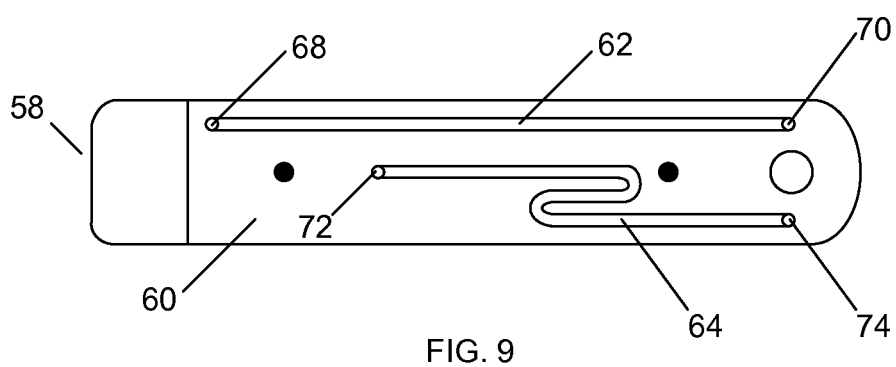
FIG. 9 illustrates a top view of the second headset boom component shown in FIG. 4B.

FIG. 8 illustrates a top view of a boom half 56. Boom half 56 is formed having an inner surface 76 including groove 78 and groove 80. FIG. 9 illustrates a top view of a boom half 58. Boom half 58 is formed having an inner surface 60 including a groove 62 and groove 64. In one example, boom half 56 and 4 are formed utilizing an injection molding process.

In assembling the headset boom 54, the boom half 56 is joined to the boom half 58 so that the groove 80 and the groove 64 form a first acoustic channel including a meander and the groove 78 and the groove 62 form a second acoustic channel. In one example, the boom half 56 and the boom half 58 are joined by bonding the boom half 56 and the boom half 58 together using a laser welding process. In one example, the first and second acoustic channels have a same path length and same cross sectional area.

In one example, the first acoustic channel includes a first end terminating in an aperture 68 configured to receive acoustic waves associated with user speech and a second end configured to transmit acoustic waves to a first microphone port. In one example, the first acoustic channel second end terminates in aperture 70. The second acoustic channel includes a first end terminating in an aperture 72 configured to receive acoustic waves associated with user speech and a second end configured to transmit acoustic waves to a second microphone port. In one example, the second acoustic channel second end terminates in aperture 74. Aperture 68 and the aperture 72 are separated by an offset distance and the first and second acoustic channels have a same path length.

Figure 12A:
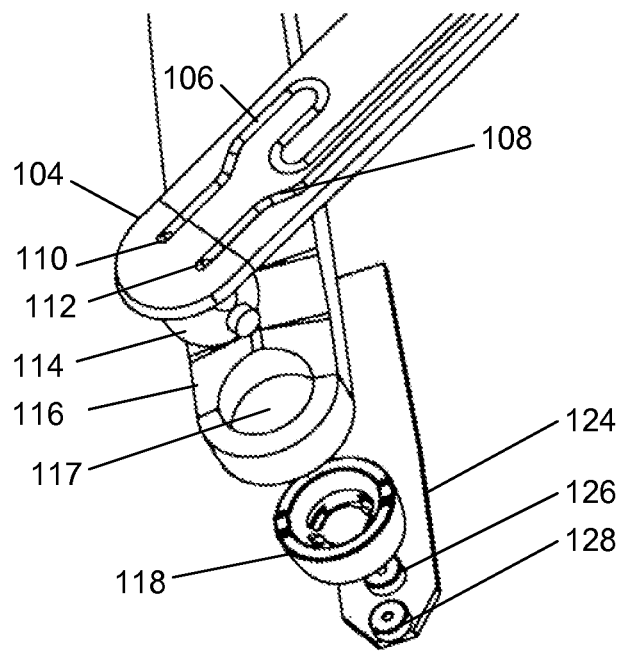
FIG. 12A illustrates a top perspective view of a disassembled headset in a further example.
Figure 12B:
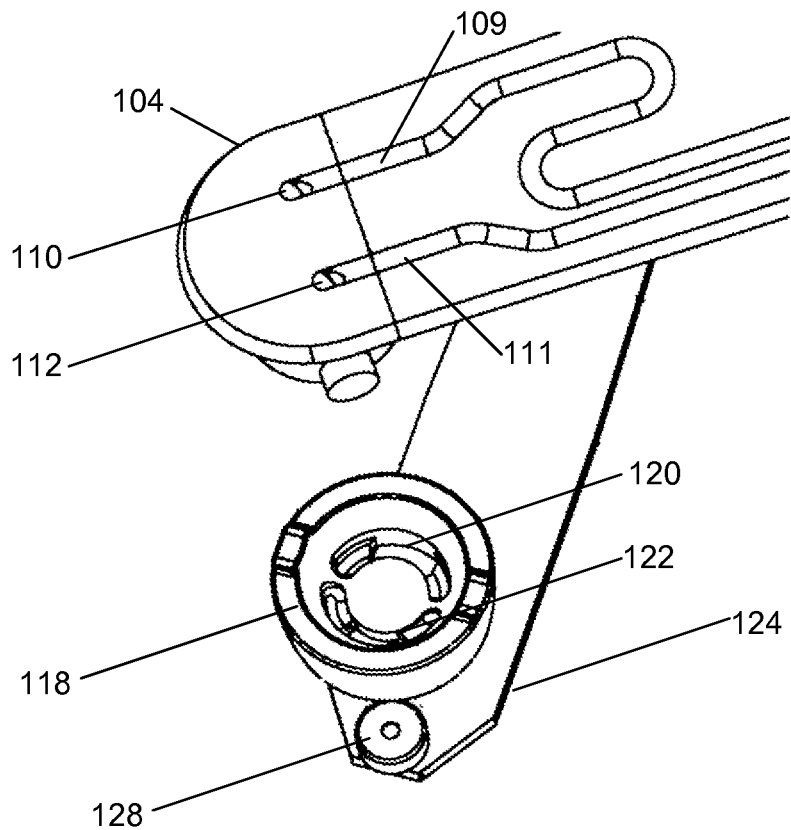
FIG. 12B illustrates an alternative top perspective view of the disassembled headset shown in FIG. 12A.
Figure 13A:
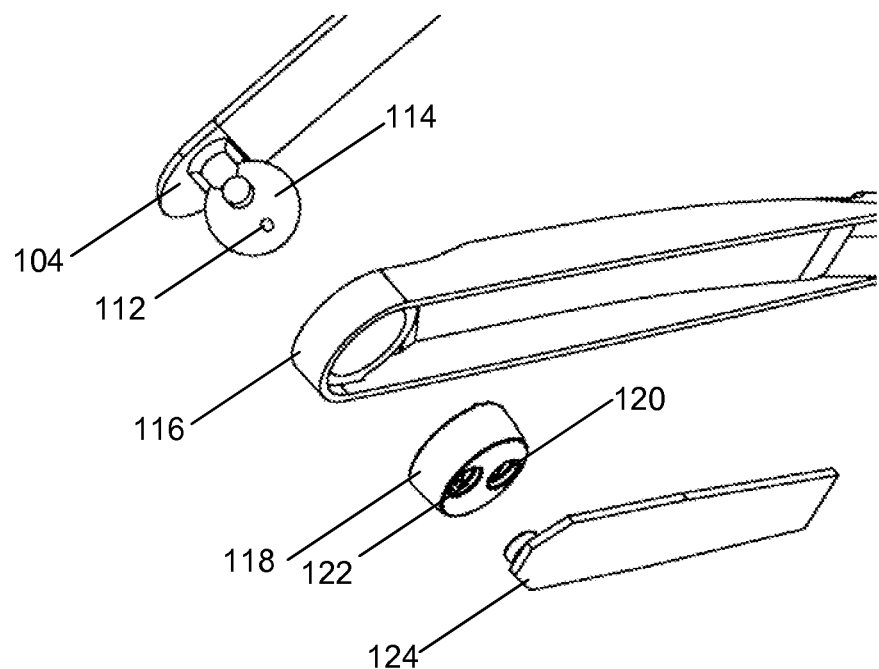
FIG. 13A illustrates a bottom perspective view of a disassembled headset in a further example.
Figure 13B:
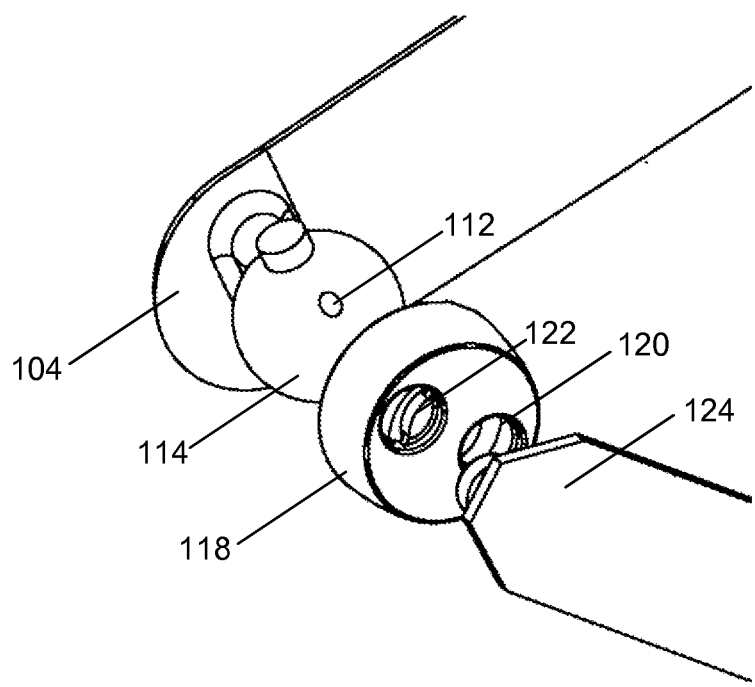
FIG. 13B illustrates an alternative bottom perspective view of the disassembled headset shown in FIG. 13A.

The boom pivot is not limited to a flat plane of rotation. As shown in FIGS. 12-13, it is possible to provide a pivot which has a three dimensional pivoting action to provide more accurate boom tip placement. For example, this is achieved in two ways: (1) creating joint through which the acoustic waveguides pass with the pivot interfacing to the microphone boots, or (2) mounting the microphones in the pivot and allowing the electrical connections to pass through the pivot. FIGS. 12A-12B illustrate top perspectives of select components of a disassembled headset in a further example. FIGS. 13A-12B illustrate bottom perspectives of the disassembled headset shown in FIGS. 12A-12B. In the example shown in FIGS. 12 and 13, pivot 36 described above has been replaced with a ball and socket type mechanism allowing for three dimensional movement of the headset boom relative to the headset body 116.

Referring to FIGS. 12 and 13, a boom half 104 includes a spheroid joint pivot ball component 114 attached to an underside. For simplicity, the corresponding boom half to be attached to boom half 104 to form a complete boom is not shown. The boom half 104 is attached to the headset body 116 by coupling spheroid joint ball component 114 with spheroid joint pivot socket component 117. Pivot ball component 114 and pivot socket component 117 form a pivoting hinge, with the two components designed to rotate with respect to one another. As the pivot socket component 117 rotates about the pivot ball component 114, so does the boom. It will be readily apparent to those skilled in the art that the pivoting hinge may take other forms in further examples.

On the upper side of boom half 104, a groove 109 terminates in a channel 110 and a groove 111 terminates in a channel 112. Channels 110 and 112 run through the thickness of the boom half 104 and through the spheroid joint ball component 114, thereby transmitting acoustic sound waves to microphone boot 118. Microphone boot 118 includes apertures 120 and 122 for receiving the sound from channels 110 and 112 respectively and transmitting the sound waves to microphones 126 and microphone 128 on PCB 124.

Figures 14A, 14B, 14C:
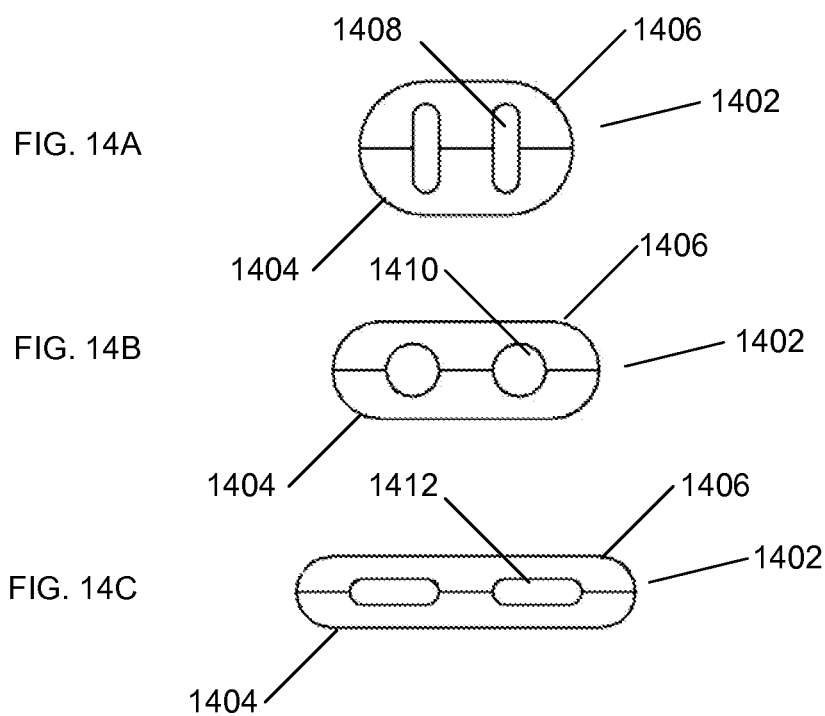
FIGS. 14A-14C illustrate various cross sectional views of a headset boom with different tube shapes.

FIGS. 14A-14C illustrate various cross sectional views of a headset boom with different shaped acoustic channels. The structure of the acoustic waveguides can be altered to suit the proposed industrial design for the boom. In the examples shown, in FIGS. 14A-14C, the acoustic waveguide cross-sectional area, the 'weld' area and the minimum wall thickness are the same yet the dimensions of the boom show significant differences.

Referring to FIGS. 14A-14C, a boom 1402 is formed from a boom half 1402 and a boom half 1404 using methods described above. Boom half 1402 and boom half 1404 may have grooves having different shaped cross sections such that when the boom halves are joined, the formed acoustic channels have different cross-sections. In the example shown in FIG. 14A, the acoustic channels 1408 are shown having greater depth than width. In the example shown in FIG. 14C, the acoustic channels 1412 are shown having greater width than depth. In the example shown in FIG. 14B, the acoustic channels 1410 are shown as being spherical.

While the exemplary embodiments of the present invention are described and illustrated herein, it will be appreciated that they are merely illustrative and that modifications can be made to these embodiments without departing from the spirit and scope of the invention. Thus, the scope of the invention is intended to be defined only in terms of the following claims as may be amended, with each claim being expressly incorporated into this Description of Specific Embodiments as an embodiment of the invention.

What is claimed is:

1. A method for constructing an acoustic waveguide for a headset boom comprising:

forming a first acoustic waveguide component of the headset boom comprising a first outer surface and a first inner surface, wherein the first inner surface comprises a first groove and a second groove;

forming a second acoustic waveguide component of the headset boom comprising a second outer surface and a second inner surface, wherein the second inner surface comprises a third groove and a fourth groove; and bonding the first acoustic waveguide component and the second acoustic waveguide component together so that the first groove and the third groove are arranged to form a first acoustic channel and the second groove and the fourth groove are arranged to form a second acoustic channel, wherein the first acoustic channel comprises a first end terminating in an aperture and a second end terminating in a first port configured to receive acoustic waves associated with user speech, and the second acoustic channel comprises a third end terminating in a second aperture and a fourth end terminating in a second port configured to receive acoustic waves associated with user speech, and wherein the first port and the second port are separated by an offset distance and the first acoustic channel comprises a meander arranged so that the first acoustic channel and the second acoustic channel have a same path length.

2. The method of claim 1, wherein the first acoustic channel and the second acoustic channel have a same cross-sectional area and length.

3. The method of claim 1, wherein the first acoustic waveguide component and the second acoustic waveguide component are formed utilizing an injection molding process.

4. The method of claim 1, wherein the first port and the second port are disposed on a first acoustic waveguide component side surface.

5. The method of claim 1, wherein bonding the first acoustic waveguide component and the second acoustic waveguide component together comprises laser welding the first acoustic waveguide component and the second acoustic waveguide component together.

6. The method of claim 1, wherein bonding the first acoustic waveguide component and the second acoustic waveguide component together forms a headset boom configured to be coupled to a headset body.

7. A headset boom comprising:
 a first boom component comprising a first outer surface and a first inner surface, wherein the first inner surface comprises a first groove including a first meander and a second groove; and
 a second boom component comprising a second outer surface and a second inner surface, wherein the second inner surface comprises a third groove including a second meander and a fourth groove, wherein the first boom component is joined to the second boom component so that the first groove and the third groove form a first acoustic channel including a meander and the second groove and the fourth groove form a second acoustic channel, and wherein the first acoustic channel comprises a first end terminating in a first port configured to receive acoustic waves associated with user speech and a second end configured to transmit acoustic waves to a first microphone port and the second acoustic channel comprises a third end terminating in a second port configured to receive acoustic waves associated with user speech and a fourth end configured to transmit acoustic waves to a second microphone port, wherein the first port and the second port are separated by an offset distance and the first acoustic channel and the second acoustic channel have a same path length.

8. The headset boom of claim 7, wherein the first boom component and the second boom component are formed utilizing an injection molding process.

9. The headset boom of claim 7, wherein the first groove and the second groove have a same path length and a different path layout on the first inner surface.

10. The headset boom of claim 7, wherein the first groove and second groove are symmetrical in cross-sectional size and shape and the third groove and fourth groove are symmetrical in cross-sectional size and shape.

11. The headset boom of claim 10, wherein the first groove and the second groove are substantially semi-circular.

12. A method for constructing an acoustic waveguide for a headset boom of a headset comprising:
 providing a first boom housing for the headset comprising a first outer surface and a first inner surface, wherein the first inner surface comprises a first groove and a second groove;
 providing a second boom housing for the headset comprising a second outer surface and a second inner surface; and
 bonding the first boom housing and the second boom housing together so that the first groove is sealed to form a first acoustic channel and the second groove is sealed to form a second acoustic channel, wherein the first groove comprises a first port arranged to receive acoustic waves associated with user speech and the second groove comprises a second port arranged to receive acoustic waves associated with user speech, wherein the first port and the second port are separated by an offset distance, and wherein the first groove and the second groove have a different path layout on the first inner surface and have a same path length.

13. The method of claim 12, wherein the first boom housing and the second boom housing are formed utilizing an injection molding process.

14. The method of claim 12, wherein bonding the first boom housing and the second boom housing together comprises utilizing a laser welding process.

15. The method of claim 12, wherein the second inner surface of the second boom housing comprises a third groove and fourth groove, wherein bonding the first boom housing and the second boom housing together comprises forming the first acoustic channel with the first groove and the third groove and forming the second acoustic channel with the second groove and fourth groove.

16. A headset boom comprising:
 a first boom component comprising a first outer surface and a first inner surface, wherein the first inner surface comprises a first groove including a first meander and a second groove; and
 a second boom component comprising a second outer surface and a second inner surface, wherein the first boom component is joined to the second boom component so that the first groove forms a first acoustic channel and the second groove forms a second acoustic channel, and wherein the first groove comprises a first port arranged to receive acoustic waves associated with user speech and the second groove comprises a second port arranged to receive acoustic waves associated with user speech, wherein the first port and the second port are separated by an offset distance on the first boom component, and wherein the first groove and the second groove have a different path layout on the first inner surface and have a same path length.

17. The headset boom of claim 16, wherein the first groove and the second groove have a same cross-sectional area.

18. The headset boom of claim 16, wherein the first groove comprises a first end terminating in an aperture extending from the first inner surface to the first outer surface and a second end terminating in a port configured to receive acoustic waves associated with user speech, and the second groove comprises a third end terminating in a second aperture extending from the first inner surface to the first outer surface and a fourth end terminating in a second port.

19. The headset boom of claim 16, wherein the second inner surface of the second boom component comprises a third groove and fourth groove, wherein the first acoustic channel comprises the first groove and the third groove and the second acoustic channel comprises the second groove and fourth groove.

* * * * *